Patented Nov. 15, 1938

2,137,098

UNITED STATES PATENT OFFICE 2,137,098

CONTROL OF PARALLEL WORKING SETS COMPRISING CONTROLLED GAS DISCHARGE PATHS

Walter Schilling, Berlin-Spandau, Germany, assignor to Siemens-Schuckertwerke Aktiengesellschaft, Berlin-Siemensstadt, Germany, a corporation of Germany Application March 5, 1936, Serial No. 67,291
In Germany March 12, 1935

3 Claims. (Cl. 175—363)

My invention relates to a vapor electric converter and particularly for a control system for insuring load division between parallel operating units of a sectionalized vapor electric converter.

In the operation of vapor electric converters it has been found desirable from the standpoint of economical construction, efficiency of operation and reliability of service to divide the converter into a plurality of parallel aggregates or units, preferably each of the units being of substantially the same capacity.

However, in the operation of such parallel converter aggregates, it is found that for various reasons one or more of the converter aggregates frequently has a tendency to assume more than its proportionate share of the total load handled by the converter. The resulting unbalance in the loading of the individual aggregates produces undesirable conditions. Not only does it limit the total output of the converter, but it may seriously endanger the reliable operation of the unitary converter sections besides producing undesirable harmonics and load conditions in the supply circuit of the converter.

It is an object of my invention therefore to provide a control system by which each section of the converter will be compelled to assume its proportionate share of the load. According to my invention, this result is accomplished by biasing the control equipment of the converter aggregates in a manner proportional to the total proportion of the load carried by such converter aggregate.

Figure 1:
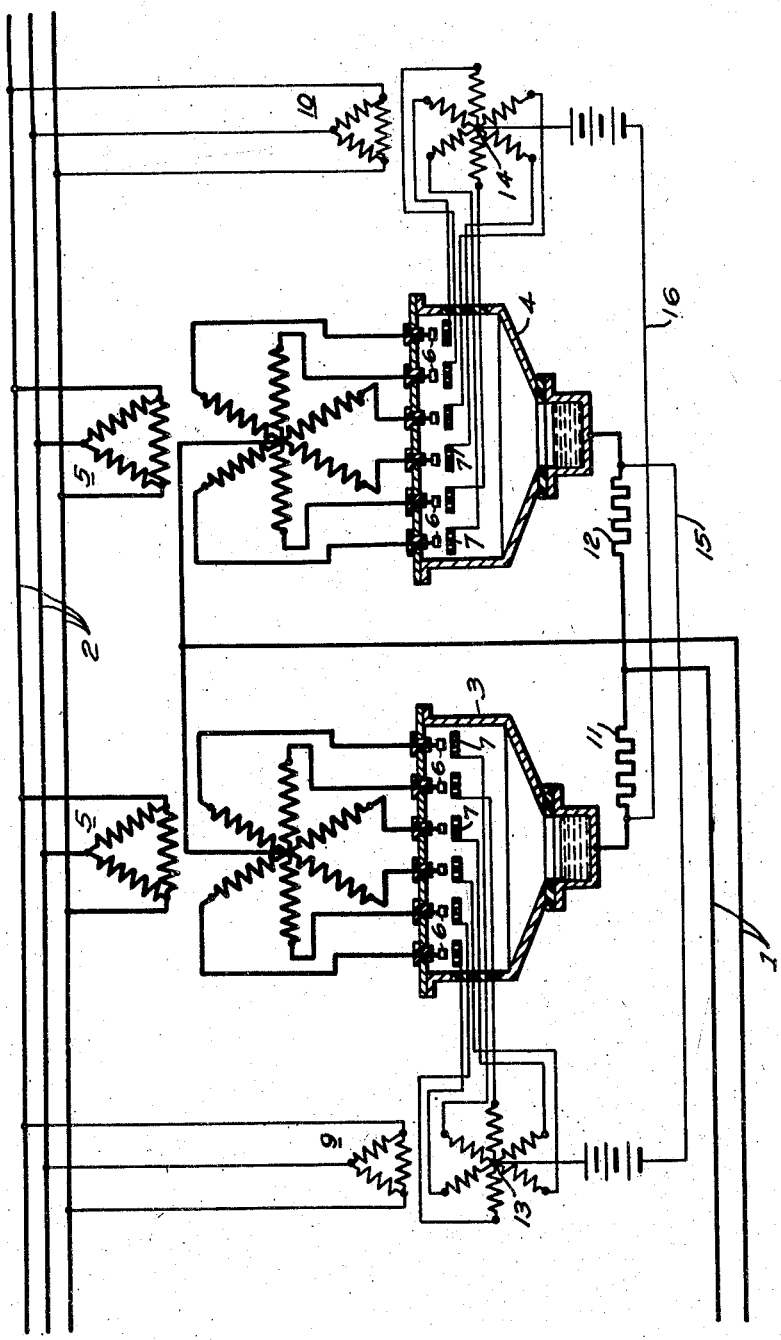
Figure 2:
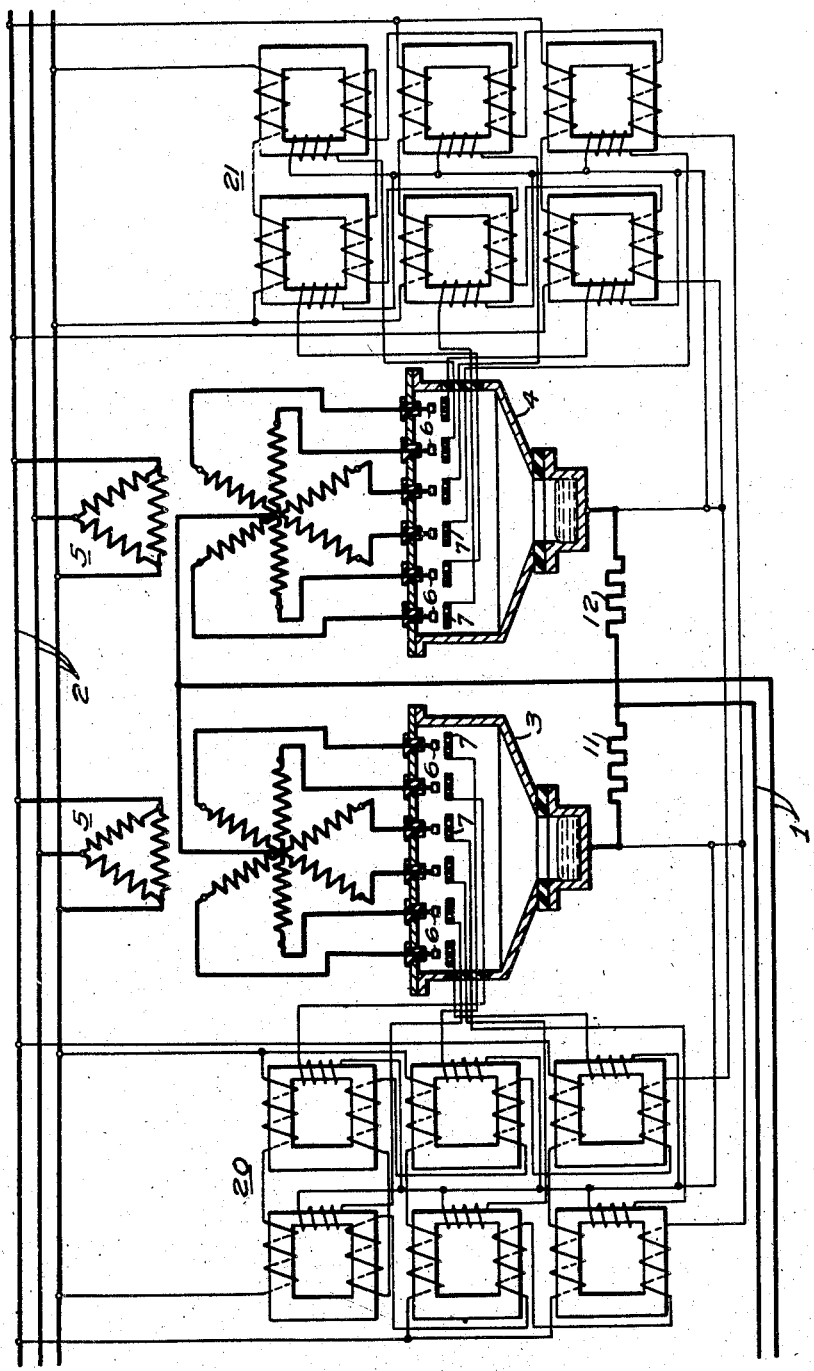

Other objects and advantages of my invention will be apparent from the accompanying description taken in conjunction with the accompanying drawings in which:

Figure 1 is a schematic illustration of a sectionalized converter embodying my invention, and Fig. 2 is a similar view showing a modified biasing system according to my invention.

In apparatus according to my invention a direct current load circuit 1 is supplied with energy from an alternating current supply system 2 by means of a vapor electric converter divided into a plurality of converter aggregates 3—4, said converter aggregates 3—4 operating in parallel. Each of the aggregates 4 is supplied with current by means of a suitable transformer 5. Either one or a plurality of transformers 5 may be used as is desired. Each of the converter aggregates 3—4 is provided with a plurality of substantially independent electric valves 6, the number depending upon the secondary phase systems of the particular supply transformer 5 utilized. Each valve 6 of the converter is provided with a suitable control electrode preferably in the form of a control grid 7 in the arc path of each of said valves 6.

Suitable impulsing devices such as impulsing transformers 9—10 are provided for the several converter aggregates 3—4 for supplying control impulses to the valves 6 of the respective converter sections 3—4.

Connected in series with each converter section, preferably in the cathode lead, is a suitable load responsive device herein shown as resistors 11—12. Assuming that each of the converter aggregates 3—4 are intended to carry substantially equal currents the individual resistors 11—12 in series with the sections will be of substantially equal resistance. In this manner the voltage drop across each of the resistors 11—12 will be substantially proportional to the load output of the converter aggregate 3 or 4 with which it is connected in series.

In the modification according to Fig. 1, the vector sum of the voltage drops through the resistors 11—12 is directly applied to the neutral points 13—14 of the secondary windings of the impulsing transformers 9—10 to retard or advance the firing angle of the valves 6 of the sections 3 and 4 as may be necessary for controlling the output load of each of the converter aggregates 3—4.

In the operation of the converter system according to Fig. 1 this will mean that if the right hand converter section 4 assumes or carries an unduly large proportion of the converter load, the voltage drop across the resistor 12 in series with the right hand converter section 4 will be greater than the voltage drop across the left hand resistor 11, so that a positive potential will be applied through the biasing connection to the neutral point 13 of the impulsing device 9 of the left hand section 3 and will tend to advance the firing angle of each of the valves 6 of the left hand converter section 3. At the same time a negative potential will be applied through the biasing connection 16 of the right hand impulsing device 10 to retard the phase angle of the valves 6 of the right hand converter section 4, thus tending to equalize the loads on each of the converter sections 3—4.

In the modification according to Fig. 2, saturated core impulsing transformers 20—21 are used and the vector sum of the voltage drops across the series resistors 11—12 is applied as a neutralizing potential to the cores of the impulsing transformers 20—21. The opposed impulsing transformers are so connected that if the right hand section 4 for instance carries a greater load than the left hand section 3, the bias will tend to maintain the saturation of the transformers 21 supplying impulses to the right hand converter aggregate 4, thus delaying the firing time of the valves of this section while at the same time it is so connected as to desaturate transformers 20 to advance the firing angle of the valves 6 in the left hand converter aggregate 3.

The corrective action in either system will be maintained as long as there is an unbalance of load between the converter aggregates 3—4 composing the converter.

While for purposes of description I have shown and described specific embodiments of my invention, it will be apparent to those skilled in the art that changes and modifications can be made therein without departing from the true spirit of my invention or the scope of the appended claims.

I claim as my invention:

1. An electrical conversion system comprising two parallel connected arc discharge devices, each having a plurality of substantially independent arc paths, control electrodes associated with each of said arc paths, an impulsing device associated with each of said arc discharge devices for supplying control impulses to the control electrodes of said devices, a resistor in series with the load current of each of said devices and means for impressing the voltage drop across each resistor onto the impulsing device corresponding to the opposite discharge device to alter the control angle of each of said devices to equalize the voltage drops across said resistors.

2. An electrical conversion system comprising two parallel operating converter aggregates each consisting of a plurality of controlled valves, a control electrode for each of said valves, an impulsing device for supplying control impulses to the control electrodes of each of said converter aggregates, a resistor element connected in series with the load current of each of said converter aggregates, and connections for impressing the vector difference of the voltage drops through said resistors on said impulsing device for varying the phase of the control impulses.

3. An electrical conversion system comprising two parallel connected vapor electric converters, each converter having a plurality of substantially independent arc paths, a control electrode in each of said arc paths, an impulse generator associated with each of the converters for supplying control impulses to the control electrodes thereof, a source of potential having a value dependent upon the amount of unbalance in the loads delivered by the respective converters and means for impressing said potential on the impulse generators to vary the phase of the control impulses to equalize the load on said converters.

WALTER SCHILLING.